June 20, 1967     F. HARTMANN     3,325,837
SCREW THREAD CUTTING APPARATUS WITH
YIELDABLE CLUTCH DRIVE MEANS Filed Aug. 20, 1964     2 Sheets-Sheet 1

INVENTOR.
FRITZ HARTMANN
BY
B.H.Schlesinger
attorney

INVENTOR.
FRITZ HARTMANN

United States Patent Office 3,325,837
Patented June 20, 1967

3,325,837
SCREW THREAD CUTTING APPARATUS WITH YIELDABLE CLUTCH DRIVE MEANS
Fritz Hartmann, Nacka, Sweden, assignor to Aktiebolaget Svenska Precisionsverktyg, Nacka, Sweden, a corporation of Sweden
Filed Aug. 20, 1964, Ser. No. 390,893
Claims priority, application Sweden, Aug. 22, 1963, 9,179/63
8 Claims. (Cl. 10—135)

This invention relates to screw thread cutting apparatus having a driving part and a driven part and torque transmitting members interposed therebetween and formed to allow axial displacement relative one another of said parts. Provided between said members are also two spring members of which one is loaded by a movement of the driven part and a screw tap supported by said driven part in a direction away from the driving part and the other one by a movement of said parts in a direction towards one another. The first-mentioned spring member is ususally a tension spring and the second-mentioned a compression spring. The purpose of the axial displacement of the parts relative one another is to allow the screw tap to operate undisturbed following its own lead only. The screw tap advances through the bore of the workpiece without any external force acting thereon, and due to this feature the screw thread is cut under correct conditions. In a thread cutting operation by means of a plurality of spindles, different pitches are often to be found on the individual taps, a spring suspension permitting operation with different pitches within the limits of the mutual displacement of the parts. The possibility of the displacement of the two main parts of the apparatus in the direction towards one another which means against the action of the compression spring is of importance for avoiding a breakdown of, or severe damage to the apparatus, in the case that due to a failure a bore should not have been formed beforehand. If the feed movement is effected by means of a lead screw the pitch thereof may be too great in relation to the pitch of some of the screw taps. The possibility of a displacement of the driven part in a direction towards the driving part is often necessary in a simultaneous screw thread cutting of end open bores and dead end bores in one and the same workpiece by a thread cutting operation combined with an automatic release of the coupling.

Known screw thread cutting apparatus which are equipped to meet these demands require a complicated disassembly each time when the displacement or the initial position of the parts relative one another is to be adjusted. Moreover, a great number of additional exchange parts must be kept available in store.

One main object of the invention is to provide an improvement of the screw thread cutting apparatus of the type in consideration so as to render possible a continuous variation of the setting of the driving and driven parts and thereby the magnitude of the tension of the spring members within the predetermined limits of displacement of the parts relative one another.

Another object of the invention is to provide a screw thread cutting apparatus in which the readjustment of the parts and of the tension of the spring members can be effected without whole or part disassembly of the apparatus and without any exchange of parts being required.

According to one main feature of the invention, there are disposed between the spring members elements adapted to adjust the mutual displacement of the parts from and towards one another from an initial position determined by the tension of the spring members without any disassemblage of the apparatus itself becoming necessary.

According to the invention, a screw thread cutting apparatus has been brought about which satisfies highly varying requirements regarding the mutual displacement or initial position of the parts when effecting some particular screw thread cutting operation. It is easy to adjust the apparatus for varying initial pressures when the screw tap is to start a thread cutting operation. This pressure may be made high even so high as to render the application of the screw tap rigid which is of value in particular when the depth of the screw thread cut must be kept within narrow limits.

Further objects and advantages of the invention will become apparent from the following description, considered in connection with the accompanying drawings which form part of this specification, and of which:

Figure 5:
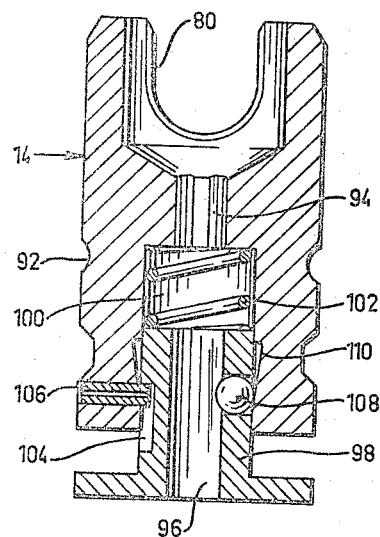
FIG. 5 is a longitudinal sectional view of a screw tap holder.

Referring to the drawings, reference numeral 10 designates a casing, in the present connection also defined as the driven part, one end portion of which is formed with a recess 12 intended for insertion of a tool holder generally designated 14 in FIG. 5. At the opposite end of the casing 10 a body 16, in the present connection also denominated the driving part, is inserted and adapted to be connected with a spindle or the like element of a tool machine. In the illustrated embodiment, a coupling is generally designated 18 and integrally united with the driving part 16. The parts 10, 16 are axially displaceable relatively to one another while the torque is being transmitted between them. To this end, the casing 10 is on its internal face formed with a longitudinally extending groove 20 and the body 16 on its external face with a corresponding groove 22. Said grooves have in their cross section a circular arch contour and between them are positioned two balls 24 rolling in the grooves under an axial displacement of the parts 10 and 16 relative one another. The balls 24 are retained in their position by a retainer or cage 26 formed with holes fitting to the diameter of the balls 24. Located between the cylindrical faces 28, 30 of the casing 10 and the body 16, respectively, are smaller balls 32, which preferably are subjected to an initial pressure and in a large number distributed over the circumference of the ball retainer and which enter into corresponding holes formed in the latter. When the parts 10 and 16 are displaced axially relative to one another, the balls 32 roll on the faces 28 and 30 and ensure thereby the desired correct position of the ball retainer and through said retainer that of the large balls 24. This feature of the screw thread cutting apparatus is known in the prior art. Due to the use of two balls in the grooves 20, 22, the required torque can be transmitted with a small moment arm which feature essentially contributes in rendering possible to construct the apparatus according to the invention with small diameter. This is of particular value when a plurality of screw thread cutting apparatus are mounted for simultaneous screw cutting of a plurality of bores with a small spacing of the center axes of adjacent bores.

Rigidly secured to, and inserted into the driven part 10 is an entraining tap 34 for the screw tap holder 14. Bearing against said tap is a holder body 36. A tension spring 38 extends through an inner bore formed in said holder body and enters with its one end a transversely extending bore 40 formed in the entraining tap 34, the loop-formed end portion 42 of said spring being disposed around a pin 44 forced into the tap 34. The other end of the tension spring 38 has a loop-formed portion 46 which is positioned around a pin 48 inserted into a groove 50 of V-shaped cross-section formed in the holder body 36.

The holder body 36 has a portion provided with an external thread 52. This thread is located within a portion of the body 16 formed with an internal non-circular face 54 which may be of hexagonal shape. This shape is corresponded by a nut 56 screwed on the thread 52 of the holder body. When thus the holder body 36 is rotated relatively to the body 16 said nut will be displaced axially in relationship to said body, both bodies retaining their peripheral position relative one another.

The tension spring 38 is preferably given an initial tension. Its tensional force is transmitted from the holder body 36 to the entraining tap 34.

Figure 1:
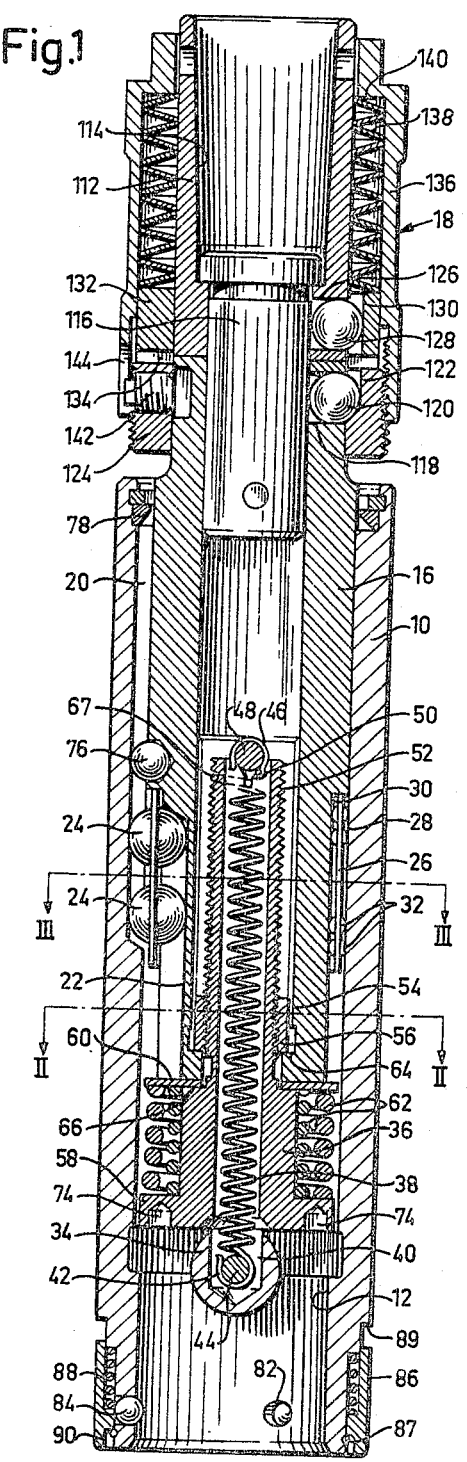
FIG. 1 is a longitudinal sectional view of a screw thread cutting apparatus constructed according to the invention.
Figure 2:
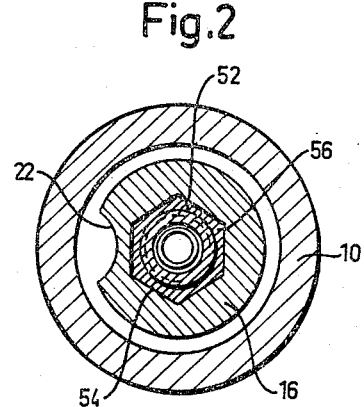
FIGS. 2 and 3 are sectional views following lines II—II and III—III, respectively of FIG. 1.
Figure 3:
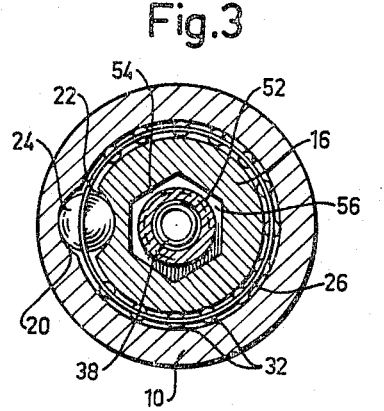

The holder body 36 has at its end facing the tap 34 a flange 58. Preferably, two compression springs 62 are disposed between said flange 58 and a washer 60 bearing against the end portion of the body 16. The initial load of said compression springs is determined by the position of the nut 56 relative the two bodies 16 and 36. In FIG. 1 the nut 56 is shown in its one end position where it bears against a shoulder 64 formed on the body 16. In this case the washer 60 may be in contact with a shoulder 66 of the holder body 36 which means that the compression springs 62 are compressed to the maximum and thus cannot be given further compression. The other end position of the nut is determined by a stop ring member 67. In this position the springs 62 have attained their maximum length. In said position they are suitably precompressed to some extent.

Figure 4:
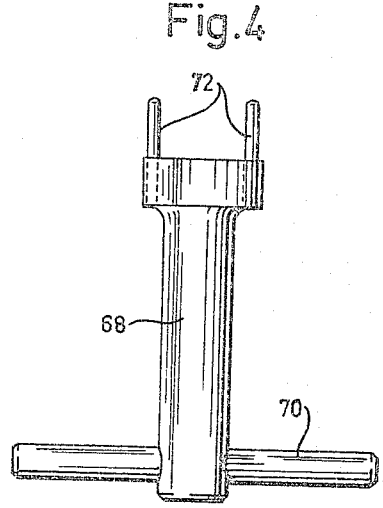
FIG. 4 is a lateral perspective view of a tool.

The tool illustrated in FIG. 4 is provided with a handle 70 and two axially projecting fingers 72 fitting into holes 74 formed in the flange 58 of the holder body 36. The holes 74 are evenly spaced around the circumference and their number is most suitably six. By stepwise rotating the holder body 36 by means of the tool or key 68 so much as each time is permitted by the entraining tap 34, for example one sixth of a revolution in the embodiment illustrated in the drawings, the nut 58 is caused to move axially on the thread 52 of the holder body 36. This implies that the driving part 16 can take different axial positions relative the holder body 36 and thereby different values of initial compression of the compression springs 62 are obtained. In the end position shown in FIG. 1 the driven part 10 is acted upon solely by the tension spring 38 when said part moves downwardly from the driving part 16 fixed in the tool machine. The limits for the displacement of the parts relative one another is determined by the length of the grooves 20, 22. A stop ball 76 inserted in the driving part 16 and movable in the groove 20 and a stop ring 78 provided in the driven part 10 limit the downward movement of the latter in the direction away from the driving part.

By causing the washer 60 to leave the shoulder 66 of the holder body 36 when screwing the nut 56 upwardly on the thread 52, the driven part 10 is made capable of moving in a direction towards the driving part 16 while the springs 62 are compressed. The elastic power of said compression spring preferably exceeds that of the tension spring 38. The driven part 10 is displaced in a direction away from the driving part 16 to the same extent as the nut is screwed upwardly on the holder body 36 which results in that within the limits of the possibilities of total displacement of the parts inside the apparatus the components of movement in the forward and backward directions can be varied in every desired manner. Another result is that the screw tap can be given various height positions. This renders possible in a simultaneous thread cutting operation with several thread cutting apparatus to adjust the screw taps to bores made in the workpiece on different levels. The position of the nut 56 relative the holder body 36 determines the possibility of displacement of the driven part 10 in both directions.

The screw tap holder 14 illustrated in FIG. 5 has a recess 80 fitting to the contour of the entraining tap 34.

The driven part 10 has a number of apertures 82 which are evenly spaced from one another over the circumference and which in the embodiment illustrated are three. These apertures are formed to permit a limited movement of balls 84 in a radially inward direction. Externally of said apertures a sleeve 86 is axially displaceable towards a stopper 87 under the actuation of a spring 88. When the sleeve 86 is displaced to engagement with a stop shoulder 89 under compression of said spring 88, a bowl-shaped recess 90 will open exactly in front of the balls 84 which in this way are set free so much as to be capable of entirely leaving the bore 12 without, however, falling out. It becomes now possible to push the screw tap holder 14 into the bore, and when thereupon the sleeve 86 is forced by the spring 88 to reoccupy its locking position, the balls 84 are forced inwardly to enter an annular groove 92 formed at the outer periphery of the screw tap holder whereby they lock said holder axially. It is thus possible to attach and remove the screw tap holder by a simple manipulation.

The screw tap is locked against rotation by a cavity 94 formed in the screw tap holder 14, said cavity having a cross section in the form of a polygon corresponding to the cross section of the screw tap. The tap is introduced into a central bore 96 of a sleeve 98 which is axially movable under the action of a spring 102 within a bore 100 formed in the screw tap holder. The sleeve 98 has an axial groove 104 which is entered by a locking pin 106. One or several balls 108 which are in a limited manner radially movable within an aperture in the sleeve 98 are adapted to collaborate with a conical surface 110 so as to allow the ball or balls 108 on insertion by pressure of the sleeve 98 into the bore 100 to be displaced to a position entirely outside the central bore 96. Now the screw tap can be inserted into said bore and on release of the sleeve 98 the ball or balls 108 are forced by the conical surface 110 to engagement with the screw tap which thereby is locked axially.

The coupling 18 is integrally connected with the driving part 16 and has an inner sleeve 112 provided with a part-conical cavity 114 for attachment of the apparatus to the spindle of the tool machine. The inner sleeve 112 is coaxial with the driving part 16, a tap 116 keeping said elements centered relatively to one another. The driving part 16 has an aperture 118 housing a ball 120 which projects into an axial groove 122 formed in a lower ring 124 and closed at its base. The inner sleeve 112 has an aperture 126 entered by a ball 128 which projects into an axial through bore 130 formed in an upper ring 132. Disposed between the two rings are cams 134 having inclined surfaces of contact engaging one another. An outer sleeve 136 is screwed onto the lower ring 124 and encloses a bundle of springs 138 bearing against a shoulder 140 formed on said sleeve and the upper ring 132. The bundle of springs is suitably precompressed. When the moment exceeds a predetermined value the cams are disengaged and cause the rings 124 and 132 to be forced out of contact under compression of the spring bundle 138.

In the operation of the screw thread cutting apparatus the torque is transmitted from the inner sleeve 112 of the coupling to the ball 128 and the ring 132 and via the cams 134 to the ring 124 and through the ball 120 to the driving part 16. Due to the feature that the balls 120, 128 are operating in axial grooves formed in the rings 124 and 132 which in turn are under the action of the springs 138, the impacts caused by the cams riding up and down on one another will be absorbed by the coupling without being propagated to the lower part of the screw thread cutitng apparatus. In this way the threads with which the screw tap is in contact are protected against any action resulting from said impacts.

The bundle of springs 138 is compressed by screwing the ring 124 and the sleeve 136 on one another. They are locked in the predetermined position by a screw 142 entering an axial groove 144 formed in the sleeve 136.

While one more or less specific embodiment of the invention has been shown and described, it is to be understood that this is for purpose of illustration only, and that the invention is not to be limited thereby, but its scope is to be determined by the appended claims.

What I claim is:

1. A screw thread cutting apparatus having a driving part and a driven part, a tool holder secured to said driven part, torque transmitting members interposed between said parts and formed to permit axial displacement of said parts relative to one another, and spring members located between said parts, one of which is loaded by displacement of said parts away from one another, and at least another one of which is loaded by displacement of said parts in the opposite direction, a pair of elements reciprocable with one another axially of said driving part and disposed between said spring members and adapted to adjust the mutual displacement of said parts axially away from and towards one another from an initial position of rest determined by the load of the spring members without any disassemblage of the apparatus proper, said one spring member resiliently holding said driven part in engagement with one of said elements, said other spring member urging said elements together axially of said driving part in one direction to a first limit position, thereby resiliently to maintain said parts in said initial position, and said one element being adjustable relative to said other element, to displace said parts in the opposite direction from said initial position, thereby to change the axial position of said tool holder.

2. The screw thread cutting apparatus as claimed in claim 1, wherein said one spring member is mounted with its ends connected to said driven part and said one element, respectively.

3. The screw thread cutting apparatus as claimed in claim 2, wherein said one spring member is a tension spring.

4. The screw thread cutting apparatus as claimed in claim 2, wherein said other spring member is mounted with its ends connected to said driving part and said one element, respectively.

5. The screw thread cutting apparatus as claimed in claim 4, wherein said other spring member is at least one compression spring.

6. The screw thread cutting apparatus as claimed in claim 1, wherein one of said elements is rotatably adjustable and changes its axial position relative to the driving member upon being rotated.

7. The screw thread cutting apparatus as defined in claim 1, wherein said one element is threaded in said other element and is engaged at one end with said driven part, said other spring member is a compression spring operatively engaged at one end with said driving part and at its opposite end with said one element resiliently to urge said elements to said first limit position, and said one element is rotatable relative to said other element simultaneously to adjust the load on said compression spring, and to adjust the axial position of said driven part relative to said driving part.

8. Screw thread cutting apparatus comprising a rotatable driven part for holding a tool, a rotatable driving part rotatable coaxially with said driven part and aligned axially therewith, a sleeve mounted coaxially on said parts for limited axial movement independently thereof, a first coupling member axially slidable in said sleeve and connected to said driving part for rotation thereby and for axial movement relative thereto, a second coupling member secured to said sleeve for axial movement therewith and connected to said driven part for rotation therewith and for axial movement relative thereto, means in said sleeve and interposed axially between said sleeve and said first coupling member to yield axially but to urge said coupling members resiliently axially toward and into driving engagement with one another, normally to transmit the rotation of said driving part to said driven part, and operative, when the torque transmitted from said driving to said driven part exceeds a predetermined value, to permit said coupling members to shift axially away from one another, and relative to said driving and driven parts, to disengage said coupling members and disconnect the drive between said parts.

References Cited
UNITED STATES PATENTS

| | | | |
|---|---|---|---|
| 2,592,103 | 4/1952 | Alfredeen | 10—135 X |
| 3,032,156 | 5/1962 | Eriksson | 10—135 |
| 3,178,739 | 4/1965 | Plummer et al. | 64—23 X |

ANDREW R. JUHASZ, *Primary Examiner.*